Patented July 25, 1933

1,919,589

UNITED STATES PATENT OFFICE

ERWIN HOFFA AND ERWIN THOMA, OF FRANKFORT-ON-MAIN-HOCHST, GERMANY, ASSIGNORS TO GENERAL ANILINE WORKS, INC., OF NEW YORK, N. Y., A CORPORATION OF DELAWARE

AZO DYESTUFF INSOLUBLE IN WATER

No Drawing. Application filed September 13, 1929, Serial No. 392,486, and in Germany March 2, 1927.

The present invention relates to blue to violet-blue water-insoluble azo dyestuffs; it is a continuation-in-part application to our U. S. Patent No. 1,745,676.

We have found that dyestuffs of valuable dyeing properties and yielding blue to violet tints are obtainable by coupling with a 2.3- hydroxynaphthoylarylamine a diazo compound of a compound of the following general formula:

wherein $R_1$ and $R_2$ represent benzene nuclei at least one hydrogen atom in the two benzene nuclei being substituted by a substituent of the group consisting of acylamino, aryloxy, alkylthio, cyano, nitro, a carboxylic acid ester, carboxylic acid arylamido group, a hydrogenated aryl residue and an arylsulfo group, whereas the other hydrogen atoms of the benzene nuclei may be substituted by any monovalent substituent.

In order to obtain water-insoluble dyestuffs it is, of course, to be understood that such substituents as are capable of rendering the final products water-soluble are to be excluded. Such groups are, for instance, sulfonic and carboxylic acid groups.

The shades are varying within wide limits; reddish-violet to deep blackish-blue tints are obtained according to the selection of the components.

The dyestuffs obtainable according to the present invention correspond to the following formula:

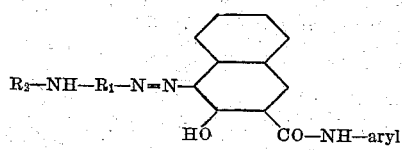

wherein $R_1$ and $R_2$ represent benzene nuclei at least one hydrogen atom in the two benzene nuclei being substituted by a substituent of the group consisting of acylamino, aryloxy, alkylthio, cyano, nitro, a carboxylic acid ester, carboxylic acid arylamido group, a hydrogenated aryl residue and an arylsulfo group, whereas the other hydrogen atoms of the benzene nuclei may be substituted by any monovalent substituent, it being understood that such groups as are capable of rendering the final product water-soluble are excluded.

The following examples serve to illustrate our invention, but they are not intended to limit it thereto; the parts being by weight:

(1) 2.8 grams of 4-amino-4'-phenoxydiphenylamine are diazotized in the usual manner with an excess of hydrochloric acid and sodium nitrite. The diazo solution which has been filtered, if necessary, and made up with cold water to 1 liter, is rendered neutral or nearly alkaline with bicarbonate and in this solution there are dyed 50 grams of cotton yarn which have been treated with a grounding liquor containing 3 grams of 2.3-hydroxynaphthoic acid-orthotoluidide, 12 grams of sodium Turkey red oil of 50 per cent strength, 9 grams of caustic soda solution of 28 per cent strength, 6 grams of formaldehyde of 40 per cent strength in 1000 cc. of liquid. After the development the material is wrung out, thoroughly washed and soaped in a hot solution. There is obtained a fast indigo-blue dyeing.

(2) 2.8 grams of diazonium chloride, obtained from 4-aminodiphenylamine-2-carboxylic acid-methyl-ester, are made into a paste with water, the whole being made up with water to 1 liter. Before dyeing, 1 gram of sodium bicarbonate is added to the solution. In this solution, there are dyed for half an hour 50 grams of cotton yarn which have been impregnated with a solution containing per liter 4 grams of 2.3-hydroxynaphthoyl-2'-methoxy-1'-aniline, 8 grams of sodium Turkey red oil of 50% strength, 4 grams of formaldehyde of 40% strength and 8 grams of caustic soda solution of 28% strength. After the development, the yarn is wrung out, well washed and treated in a hot soap bath. The dyeing thus obtained has a reddish-blue shade.

The following examples serve to furthermore illustrate the invention:

| Diazo component | Grounding liquor | Dyeing |
|---|---|---|
| 2,3-hydroxynaphthoyl | | |
| 4 - amino - 2 - carboxy - methyl - 2' - chloro - 4' - methyl - diphenylamine | - 4' - chloro - 1' - aniline | Reddish-blue |
| 4 - amino - 2' - carboxyethyldiphenylamine | -1'-aniline | Very dark violet. |
| 4 - amino - 4' - cyanodiphenylamine | - 2' - methyl - 1' - aniline | Reddish-blue |
| 4 - amino - 4' - nitrodiphenylamine | - 2' - methyl - 1' - aniline | Very dark violet. |
| 4 - amino - 4' - hexahydrophenyldiphenylamine | - 2' - methyl - 4' - chloro-1'-aniline | Reddish-blue |
| 4 - amino - 4' - acetylaminodiphenylamine | - 2' - methyl - 1' - aniline | Reddish-blue |
| 4 - amino - 4' - benzoylaminodiphenylamine | - 2' - methyl - 4' - chloro-1'-aniline | Middle blue |
| 4 - amino - 2 - carboxylic acid - anilide-diphenylamine | -1'-aniline | Reddish-blue |
| 4 - amino - 4' - methyl - 2 - carboxylic acid - anilid - di - phenylamine | -beta - naphthylamine | Dark navy-blue |
| 4 - amino - 2' - (para - toluol - sulfonyl)-diphenylamine | -1'-aniline | Reddish violet |
| 4' - ethylthio - 4 - aminodiphenylamine | -1'-aniline | Blue |
| 4-amino-diphenylamine | - 4' - chloro - 2' - methyl-1'-aniline | Middle blue. |

Instead of producing the dyestuffs on the fiber as indicated in the preceding examples they can also be produced in substance or on any of the usual substrata which are adapted for the production of lakes and isolated in a suitable manner.

Since the object of the present invention is to provide dyestuffs of good fastness properties, which dyestuffs are insoluble in water and alkalies, it is to be understood that the aromatic nuclei of the general formulæ appearing in the appended claims contain no substituents as are known to render organic compounds soluble in water or alkalies and to tend to depreciate the fastness of the dyestuffs to alkalies. Substituents of this kind are, for instance, the sulfonic acid and the carboxylic acid group.

We claim:

1. As new products, the dyestuffs of the following general formula:

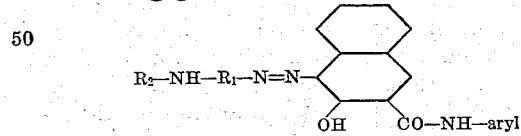

wherein $R_1$ and $R_2$ represent benzene nuclei, at least one hydrogen atom of the benzene nuclei being substituted by a substituent of the group consisting of acylamino, aryloxy, alkylthio, cyano, nitro, a carboxylic acid ester, carboxylic acid arylamido group, a hydrogenated aryl residue and an arylsulfo group, whereas the other hydrogen atoms of the benzene nuclei may be substituted by halogen, alkyl or alkoxy, which dyestuffs are insoluble in water and yield when produced on the fiber dyeings, the shades of which vary from reddish-violet to deep blackish-blue.

2. As new products, the dyestuffs of the following general formula:

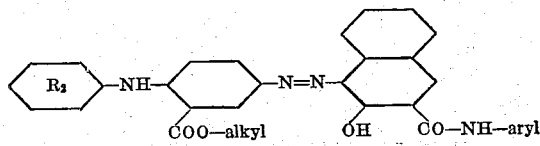

wherein the benzene nucleus $R_2$ may be substituted by halogen or alkyl, which dyestuffs are insoluble in water and yield when produced on the fiber dyeings, the shades of which vary from reddish-violet to deep blackish-blue.

3. As a new product, the dyestuff of the following probable formula:

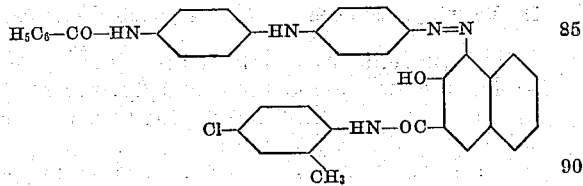

yielding when produced on the fiber medium blue shades.

4. As a new product, the dyestuff of the following probable formula:

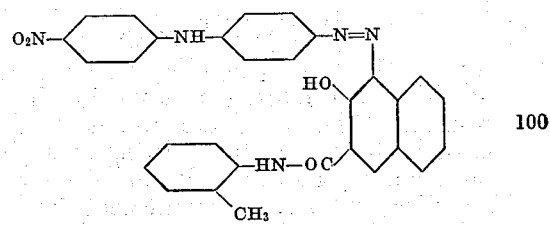

yielding when produced on the fiber very dark violet shades.

5. As new products, the dyestuffs of the following general formula:

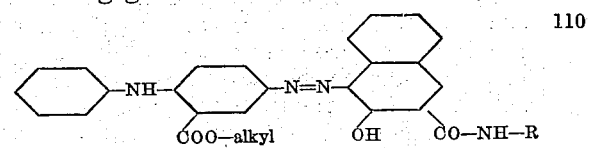

wherein R stands for a radical of the benzene or naphthalene series, which dyestuffs, are insoluble in water and yield when produced on the fiber dyeings the shades of which vary from violet to deep-blue.

6. As new products, the dyestuffs of the following general formula:

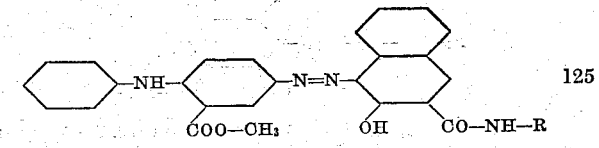

wherein R stands for a benzene radical which may be substituted by halogen, alkyl or alkoxy, which dyestuffs are insoluble in water and yield when produced on the fiber dyeings the shades of which vary from violet to deep-blue.

7. As new products, the dyestuffs of the following general formula:

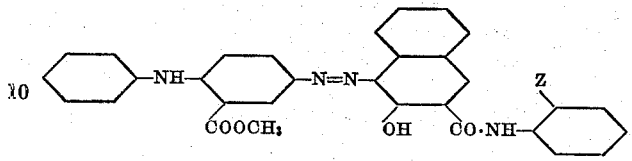

wherein Z stands for hydrogen, a $CH_3$ or a $OCH_3$ group, which dyestuffs, are insoluble in water and yield when produced on the fiber dyeings the shades of which vary from reddish-blue to deep-blue.

8. As a new product, the dyestuff of the following general formula:

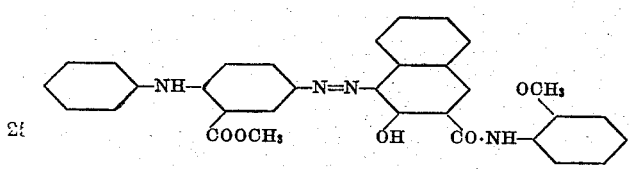

which dyestuff, is insoluble in water and yields when produced on the fiber reddish-blue dyeings.

9. Fiber dyed with the dyestuffs as claimed in claim 5.

10. Fiber dyed with the dyestuffs as claimed in claim 6.

11. Fiber dyed with the dyestuff as claimed in claim 7.

12. Fiber dyed with the dyestuff as claimed in claim 8.

13. Fiber dyed with the dyestuffs as claimed in claim 1.

14. Fiber dyed with the dyestuffs as claimed in claim 2.

15. Fiber dyed with the dyestuffs as claimed in claim 3.

16. Fiber dyed with the dyestuff as claimed in claim 4.

ERWIN HOFFA.
ERWIN THOMA.